(12) United States Patent
Schmidtke et al.

(10) Patent No.: US 12,352,573 B2
(45) Date of Patent: Jul. 8, 2025

(54) LEVELLING LASER AND OPTICAL PROJECTION LENS

(71) Applicant: Robert Bosch GmbH, Stuttgart (DE)

(72) Inventors: Bernd Schmidtke, Leonberg (DE); Derek Chan, Shatin (HK); Sudhir Kumar Neravati, Bidar (IN); Louisa Zhang, DongGuan (CN); David Kapfenberger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 581 days.

(21) Appl. No.: 17/772,748

(22) PCT Filed: Oct. 19, 2020

(86) PCT No.: PCT/EP2020/079353
§ 371 (c)(1),
(2) Date: Apr. 28, 2022

(87) PCT Pub. No.: WO2021/083702
PCT Pub. Date: May 6, 2021

(65) Prior Publication Data
US 2022/0373330 A1    Nov. 24, 2022

(30) Foreign Application Priority Data

Oct. 30, 2019   (DE) .................... 10 2019 216 724.1

(51) Int. Cl.
*G01C 15/00*   (2006.01)
*G02B 3/06*    (2006.01)
*G02B 19/00*   (2006.01)

(52) U.S. Cl.
CPC ............. *G01C 15/004* (2013.01); *G02B 3/06* (2013.01); *G02B 19/0052* (2013.01)

(58) Field of Classification Search
CPC ..... G01C 15/004; G02B 3/06; G02B 19/0052; G02B 3/02; G02B 19/0014
See application file for complete search history.

(56) References Cited

U.S. PATENT DOCUMENTS 6,069,748 A * 5/2000 Bietry ................. G02B 3/06
359/710
6,931,737 B1 * 8/2005 Liao ................... G01C 15/004
33/286

(Continued)

FOREIGN PATENT DOCUMENTS

DE   10 2007 039 343 A1   2/2009
EP      2 379 983 B1      6/2015
WO      02/079727 A1     10/2002

OTHER PUBLICATIONS

International Search Report corresponding to International Patent Application No. PCT/EP2020/079353, mailed Jan. 25, 2021 (5 pages).

*Primary Examiner* — Yaritza Guadalupe-McCall
(74) *Attorney, Agent, or Firm* — Maginot, Moore & Beck LLP

(57) ABSTRACT

A levelling laser for generating a laser projection line on a surface is disclosed. The levelling laser includes an optical projection lens with a three-dimensional lens surface. The projection lens can be described in a three-dimensional coordinates system having three axes, X, Y and Z, arranged orthogonally to one another. The Z-axis coincides with the optical axis of the projection lens. The lens surface of the projection lens has a shape with a surface inclination angle rising monotonically along the X-axis. A corresponding projection lens is also disclosed.

14 Claims, 3 Drawing Sheets

(56) References Cited

U.S. PATENT DOCUMENTS

| | | | | |
|---|---|---|---|---|
| 7,520,062 B2* | 4/2009 | Munroe | ............... | G01C 15/004 |
| | | | | 33/286 |
| 7,821,722 B2* | 10/2010 | Chou | ..................... | G02B 13/04 |
| | | | | 359/680 |
| 8,023,196 B2* | 9/2011 | Lin | ........................ | G02B 13/04 |
| | | | | 359/650 |
| 8,203,792 B2* | 6/2012 | Yeh | ........................ | G02B 13/18 |
| | | | | 359/650 |
| 2005/0166408 A1* | 8/2005 | Liao | ..................... | G01C 15/004 |
| | | | | 33/286 |
| 2006/0013278 A1* | 1/2006 | Raskin | ................. | G01C 15/004 |
| | | | | 33/290 |
| 2007/0124947 A1* | 6/2007 | Munroe | ................... | G02B 3/02 |
| | | | | 33/286 |
| 2008/0008125 A1 | 1/2008 | Pham et al. | | |
| 2022/0155666 A1* | 5/2022 | Wu | ..................... | G02B 17/0816 |
| 2022/0373330 A1* | 11/2022 | Schmidtke | ............... | G02B 3/02 |

* cited by examiner

LEVELLING LASER AND OPTICAL PROJECTION LENS

This application is a 35 U.S.C. § 371 National Stage Application of PCT/EP2020/079353, filed on Oct. 19, 2020, which claims the benefit of priority to Serial No. DE 10 2019 216 724.1, filed on Oct. 30, 2019 in Germany, the disclosures of which are incorporated herein by reference in their entirety.

The disclosure relates to a leveling laser for producing a laser projection line on a surface, comprising an optical projection lens, and to a corresponding optical projection lens.

BACKGROUND

DE 10 2007 039 343 A1 discloses the general construction of a leveling laser, here in particular a self-aligning leveling laser (what is known as a pendulum laser).

Optical lenses based on free-form surfaces are known from the prior art, for example from the technical field of laser rangefinders. For example, EP 2379983 B1 discloses a free-form lens for compensating optical power losses occurring during the measurement of small distances from the laser rangefinder to the target. In such near-field measurements, the problem arises that a parallax shift between an emitted laser beam and a received, i.e. reflected, laser beam affects the measurement result comparatively strongly. In particular, power losses arise due to the fact that the laser beam imaged on the detector of the laser rangefinder no longer completely strikes the active surface of the detector on account of the parallax shift of the transmission and receiving path.

SUMMARY

In a first aspect, the disclosure relates to a leveling laser (also: leveling apparatus) for producing a laser projection line on a surface. The leveling laser in this case serves for producing an optical mark in the form of a laser projection line for leveling, alignment, measurement, and/or marking tasks, as occur in particular in the area of manual labor and skilled trade, for example interior construction of buildings, construction work, when providing marks on walls, or the like. The precise form of the laser projection line produced by means of the leveling laser can differ, among other things depending on the area of use and the task. For example, the laser projection line can also comprise a plurality of marking points and/or a plurality of marking lines, including interrupted marking lines. Furthermore, the leveling laser can be provided for producing the laser projection line in a temporally variable manner, in particular for example in a blinking manner. In principle, leveling lasers enable the production of laser marks, in particular the projection thereof onto objects, which represent a reference that is independent of an alignment of floors, ceilings, walls, or other items, for example the vertical wall of a cabinet.

The leveling laser typically has a housing with at least one opening, in particular a window, wherein the laser projection line is emitted through the opening onto the surface on which the laser projection line is to be produced. The leveling laser is dimensioned such that it can be transported solely by hand, in particular using one hand, without the aid of a transport machine. The mass of the leveling laser is less than 5 kg, in particular less than 2 kg, and very particularly less than 1 kg. The dimensions of the leveling laser in a first direction (in particular the direction of the axis x, see below) are less than 15 cm, in particular less than 10 cm, very particularly less than 5 cm. The dimensions of the leveling laser in a second direction (in particular the direction of the axis z and/or y, see below) are less than 25 cm, in particular less than 15 cm, very particularly less than 10 cm.

The leveling laser is configured to level the emitted laser projection line, for example horizontally, vertically or according to another leveling angle. In particular, the leveling angle can be selected by a user. Leveling can be effected for example by using a pendulum arrangement provided in the housing of the leveling laser, by means of which arrangement the laser projection line is emittable such that it may freely self-align with the vertical line, in particular oscillate or swing to all sides, independently of an alignment of the housing. The pendulum arrangement here carries and levels all the optical components of the leveling laser, that is to say at least a laser unit for generating laser radiation and a projection lens. Alternatively, the housing can enable manual alignment of the laser projection line. In this case, the optical components, that is to say at least the laser unit for generating laser radiation and the projection lens, are fixedly arranged in the housing of the leveling laser. It is furthermore conceivable to provide a leveling sensor, in particular an inertial sensor, a magnetic field sensor, an acceleration sensor, a gravity sensor, or the like, and/or a spirit level in the housing, which can be used to manually (by way of a user) and/or automatically (for example motor-driven) bring the laser projection line into a desired leveled state. In particular, the leveling laser can comprise an, in particular optical, acoustic, or haptic, output apparatus, by means of which a state of leveling can be output to a user. In this way, the user can see from the spirit level and/or an output signal when or under what conditions ("rotate further by 5°") a leveled state of the laser projection line has been achieved.

The leveling laser comprises, as optical components, at least a laser unit and an optical projection lens having a three-dimensional lens surface, wherein the projection lens is describable in a three-dimensional coordinate system having three axes x, y, z which are arranged at right angles with respect to one another, and wherein the axis z coincides with the optical axis of the projection lens. In one embodiment of the leveling laser, the laser unit and the projection lens are the only optical components in the transmission path (also referred to as the projection path) of the leveling laser. The laser unit has at least one laser light source, for example a semiconductor laser or a laser diode. In one embodiment, the laser radiation is provided in a spectral wavelength range that is visible to the human eye, i.e. in particular between 380 nm to 780 nm, for example in the form of red laser light of 635 nm. The laser unit can furthermore comprise optical elements that are beam-shaping and/or beam-directing and/or influence the properties of the laser radiation, in particular for example lenses such as collimators, collimator lenses, filters, diffractive elements, mirrors, reflectors, optically transparent plates, or the like.

The projection lens is arranged in the transmission path of the leveling laser. The projection lens is used for refracting and spreading the laser beam into a laser fan (laser plane) extending in the plane spanned by the axes x, z. The intersection of this laser plane with the surface produces the laser projection line which is visible to the human eye. In one embodiment of the leveling laser, the projection lens has a mirror-symmetric, in particular cylindrical, shape in the direction of the axis y. In this way, it is possible to ensure that the projection lens does not manifest any refractive power in the direction of the axis y, and the entire radiant power of the laser beam is thus spread particularly efficiently to form the laser fan. The laser projection line can thus be made to be particularly narrow in the direction of the axis y (laterally restricted). In one embodiment of the leveling laser, the projection lens is illuminable by means of a collimated laser beam in the direction of the optical axis or is correspondingly illuminated in a use state or operating state of the laser unit. The collimated laser beam can be generated in particular by using a collimator or a collimator lens, which is located in the optical transmission path downstream of the laser unit and in particular upstream of the projection lens. In one embodiment, the projection lens and the collimator lens can be integrated to form an individual lens structural element. In this case, in one embodiment of the leveling laser, the laser unit and the lens structural element can be in particular the only optical components in the transmission path of the leveling laser. Alternatively, the collimator lens and the laser unit can be integrated to form an individual laser unit structural element. In this case, in one embodiment of the leveling laser, the laser unit structural element and the projection lens can be in particular the only optical components in the transmission path of the leveling laser. In particular, it is possible in this way to provide structural elements which are compact and in particular integrated in terms of their function, and the leveling laser can be made to be particularly compact. Furthermore, installation and adjustment of the optical components in a manufacturing method of the leveling laser is significantly simplified. In one embodiment of the leveling laser, the projection lens is made from plastic. The plastic is here optically transparent at least to the wavelength of the laser light used. Advantageously, a projection lens made of plastic can be manufactured particularly cost-effectively and at the same time precisely, for example using a plastic injection molding method.

In one embodiment of the leveling laser, the leveling laser is configured to be arranged directly on a surface. The arrangement on the surface can take place here by means of a person skilled in the art of known securing means, such as adhesive strips, screws, or the like. In particular, the housing of the leveling laser can comprise corresponding apparatuses, for example a reusable adhesive pad arranged on the back of the housing, as is known for example from U.S. Pat. No. 9,909,035 B. In one embodiment, the leveling laser is configured to project the laser projection line onto the surface, or to produce it on the surface, on which the leveling laser is arranged in a state of utilization. In one embodiment of the leveling laser, the laser projection line is projectable onto a surface, wherein the laser projection line has an alignment parallel to the optical axis of the projection lens, in particular also parallel to the optical axis of the laser radiation that is incident on the projection lens, and is arranged at a distance from the optical axis of the projection lens by a shift of Δx in the direction of the axis x. The surface lies in the plane that is spanned by the axes y, z, wherein the surface is arranged at a distance from the optical axis of the projection lens by a shift of Δx in the direction of the axis x. In this way, a particularly simply and intuitively operable leveling laser can be provided. In particular, the space requirement is low because the leveling laser requires no distance from the surface, as is the case for example in pendulum lasers known from the prior art.

To produce a laser projection line that is as homogeneously lit as possible on the surface, in particular on the surface on which the leveling laser is arranged in a state of utilization, it is proposed that the lens surface has, at least in a portion of the projection lens that is usable for producing the laser projection line, a shape with a surface inclination angle that increases monotonically along the axis x. The lens surface is implemented in particular in the form of a freeform surface. The lens surface can be described in the direction of the axis z by a function $z=f(x)$, wherein the derivation $z'(-x)$ is a monotonically increasing function. According to the disclosure, it is possible in this way to achieve, starting from an, in particular collimated, laser beam, that a laser projection line that is as homogeneously illuminated as possible is producible on, in particular projectable onto, the surface, wherein the leveling laser is simultaneously arranged on the surface. The projection lens permits the provision of an intensity profile that is asymmetric with respect to the optical axis of the projection lens.

The surface inclination angle represents the angle of the lens surface in relation to the axis x.

The "portion of the projection lens that is usable for producing the laser projection line" is in particular understood to mean that the portion of the projection lens that is used for producing the laser projection line and is illuminated with incoming laser radiation has said shape. Deviations from the shape according to the disclosure are conceivable in this portion of the projection lens within the context of manufacturing tolerances. Furthermore, significant deviations from the shape according to the disclosure are conceivable in such portions of the projection lens that are either not illuminated with laser radiation or whose contribution to the production of the laser projection line are insignificant (for example because these parts of the laser fan are blocked by the housing).

In one embodiment of the leveling laser, a maximum surface inclination angle is provided on a side of the projection lens that faces—viewed in the direction of the axis x—the surface. The maximum surface inclination angle can in this case depend on the smallest distance of the laser projection lens from the projection lens. The smallest distance in particular denotes the start of the laser projection line from the leveling laser viewed in the direction of the axis z. The maximum surface inclination angle is in particular selected such that the smallest distance is less than 100 mm, in particular less than 50 mm, more particularly less than 25 mm. In one exemplary embodiment, the smallest distance is 10 mm. Furthermore, a minimum surface inclination angle is consequently provided on a side of the projection lens facing away—viewed in the direction of the axis x—from the surface. The minimum surface inclination angle can here be dependent on the largest distance of the laser projection line from the projection lens. The largest distance here denotes the end of the laser projection line from the leveling laser viewed in the direction of the axis z. The minimum surface inclination angle is selected in particular such that the largest distance is more than 750 mm, in particular more than 1500 mm, more particularly more than 2000 mm.

According to the disclosure, a laser projection line can thus be produced on a surface that simultaneously represents a standing surface or arrangement surface (or basis) of the arranged leveling laser. Compared to apparatuses known from the prior art, in which a laser projection line on a surface is produced by means of grazing incidence of the laser beam emitted by a laser unit, the present leveling laser permits a significantly simpler construction (without mirrors or the like) with simultaneously very homogeneous lighting of the laser projection line over the entire length thereof.

In a further aspect of the disclosure, an optical projection lens of an above-stated leveling laser having a three-dimensional lens surface is proposed, wherein the projection lens is describable in a three-dimensional coordinate system having three axes x, y, z that are at right angles to one another, and wherein the z-axis coincides with the optical axis of the projection lens. According to the disclosure, the lens surface of the optical projection lens at least regionally has a shape with a surface inclination angle that increases monotonically along the axis x.

"Provided" and "configured" are in particular intended to mean specifically "programmed," "designed" and/or "equipped." An object being "provided" for a specific function is in particular intended to mean that the object fulfils and/or performs this specific function in at least one application and/or operating state or is designed to fulfil the function.

BRIEF DESCRIPTION OF THE DRAWINGS

The disclosure will be explained in more detail in the following description using exemplary embodiments illustrated in the drawings. The drawing, the description, and the claims contain numerous features in combination. A person skilled in the art will, as needed, consider the features individually or combine them in reasonable further combinations. Identical reference signs in the figures denote identical elements.

In the figures.

DETAILED DESCRIPTION

Figure 1:
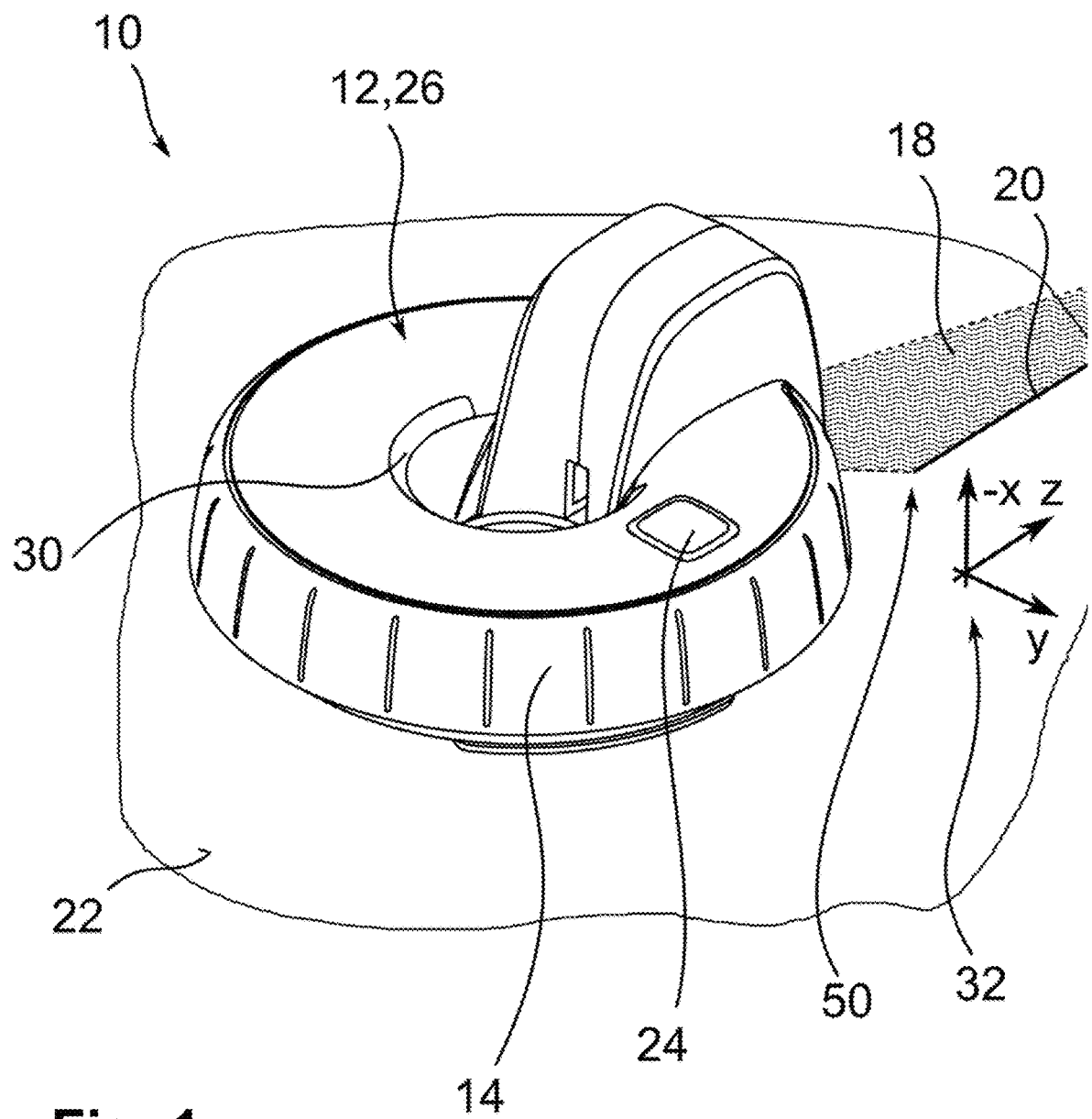
FIG. 1 shows a perspective illustration of a configuration of the leveling laser according to the disclosure.

The illustration of FIG. 1 shows an embodiment of a leveling laser 10 according to the disclosure in a perspective side view. The leveling laser 10 serves for producing a laser projection line 20 on a surface 22. The leveling laser 10 has a flat, substantially donut-shaped housing 12 having a diameter of approximately 10 cm and a maximum height of approximately 5 cm. The leveling laser 10 has a mass of approximately 300 grams. The housing 12 preferably substantially consists of a polymer material or a, for example fiber-reinforced, composite material (for example fiber-reinforced duroplast or thermoplastic material). The housing 12 surrounds the mechanical, optical, and electronic component parts of the leveling laser 10 and protects them against mechanical damage and reduces the risk of contamination. To reduce the harmful effects of impacts on the leveling laser 10 and for more comfortable handling by the user, the housing 12 is partially covered with a soft grip component 14. On the front side (not illustrated in more detail here), an opening is provided in the housing 12, in particular an exit opening. An optical signal, in particular laser radiation 18 emitted by a laser unit 16 (see in particular FIG. 3) arranged in the housing 12, for producing at least one laser projection line 20 on a surface 22 of an object, can emerge from the housing 12 through the exit opening. The exit opening is provided with a window element (not illustrated in more detail) that is transparent to the laser radiation 18, or at least translucent, with the result that the interior of the leveling laser 10 is protected against damage and environmental influences, for example against the ingress of moisture and dust.

Figure 2:
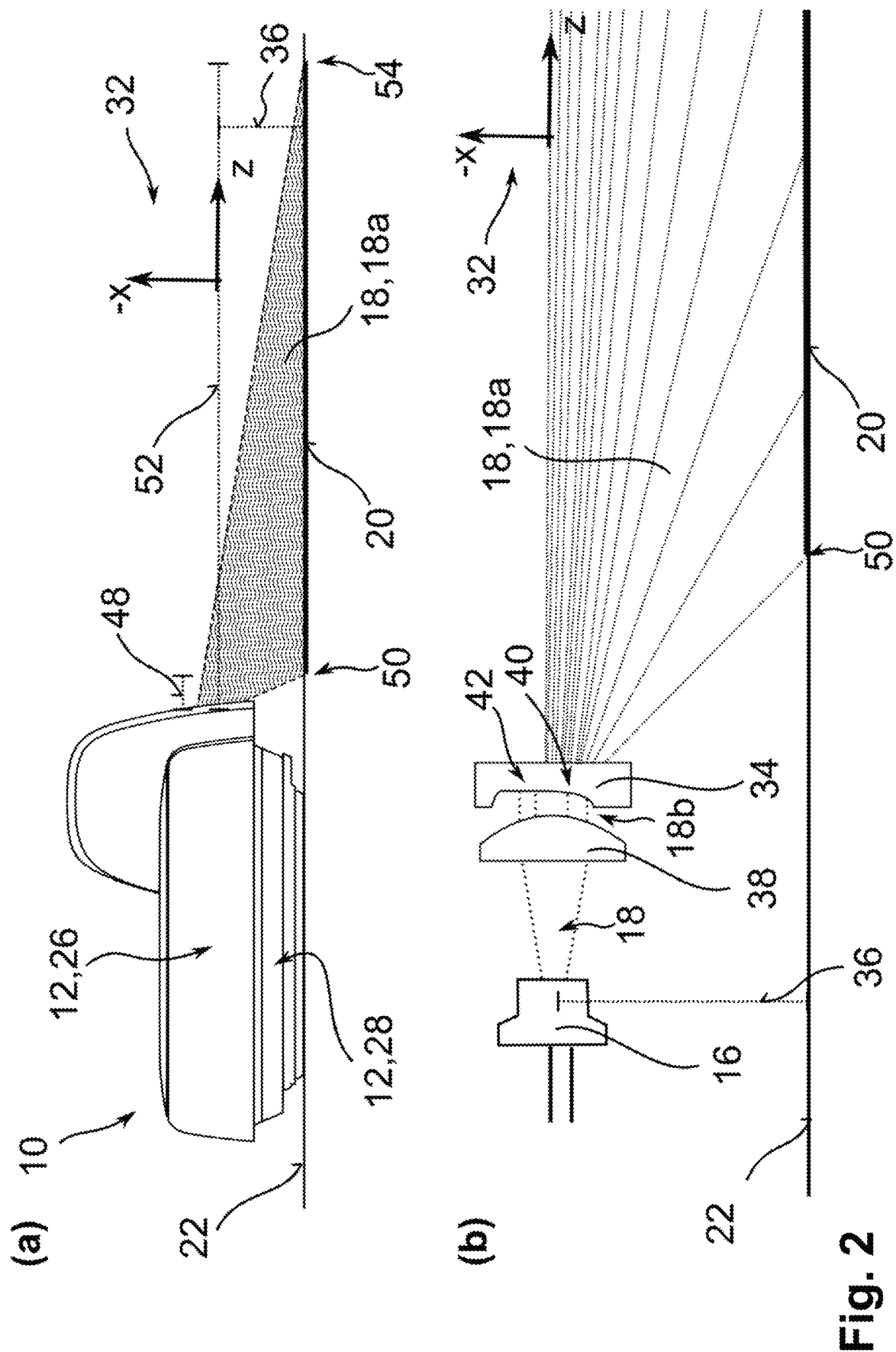
FIG. 2a shows a schematic side view of the configuration of the leveling laser according to the disclosure from FIG. 1.
FIG. 2b shows a schematic side view of the optical components including a projection lens according to the disclosure.

The housing 12 has an upper housing shell 26 and a lower housing shell 28 (see FIG. 2), wherein the upper housing shell 26 is mounted so as to be rotatable relative to the lower housing shell 28. It is thus possible for a user of the leveling laser 10 to rotate the direction of the emitted laser radiation 18 relative to the leveling laser 10, in particular relative to the center of the leveling laser 10.

A switch 24, whose actuation activates/deactivates the electronic system arranged in the housing 12, in particular an energy supply of the laser unit 16 and of the sensor system, is located on the upper housing shell 26 of the housing 12.

The leveling laser 10 is arranged by its underside (that is to say by the lower housing shell 28) directly on or at the surface 22. In the exemplary embodiment illustrated, the leveling laser 10 is arranged reversibly on the surface 22 using a reusable adhesive pad applied on the back of the housing. The leveling laser 10 is configured to project the laser projection line 20 directly onto the surface 22 on or at which it is arranged. For the following description, a three-dimensional coordinate system 32 is defined, comprising three axes x, y, z that are arranged at right angles to one another. The axis z coincides with the optical axis of the projection lens 34 (see in particular FIGS. 2a, 2b), while the surface 22 is located substantially parallel at a distance from a plane defined by the axes y, z by the distance 36 ($\Delta$x) (see also FIGS. 2a, 2b).

Not illustrated further in FIG. 1 is a battery compartment arranged laterally at the housing 12 for receiving batteries to supply energy to the leveling laser 10 and further electronic components that serve for leveling of the leveling laser 10. The further components comprise at least one inclination sensor, by means of which an inclination of the leveling laser 10 can be ascertained, in particular of the emitted laser radiation 18, for example relative to the vertical and/or relative to the horizontal or the like. The inclination sensor is connected for signal transmission at least to an output apparatus 30—here implemented in the form of an illuminable LED strip—wherein, in a leveled state of the leveling laser 10, the output of a green luminous signal indicates the leveled state to a user, while in a non-leveled state the output of a red luminous signal indicates the non-leveled state to the user. In order to move from a non-leveled state into a leveled state, the user merely needs to rotate the upper housing shell 26 relative to the lower housing shell 28 connected to the surface 22 until the emitted laser radiation 18 is leveled and the output apparatus 30 outputs a green luminous signal. It should be noted that the leveling laser 10 is in particular suitable for use on a vertical wall, with the result that, by rotating the upper housing shell 26, a horizontally leveled laser projection line 20 and/or a vertically leveled laser projection line 20 is/are settable. Furthermore, it is conceivable to specify a leveling angle (for example "45°"), for example using an external device, such as a smartphone or the like, that is connectable for signal transmission to the leveling laser 10.

FIG. 2a shows the previously described leveling laser 10 in a schematic side illustration. FIG. 2b shows the optical components of the leveling laser 10 in a schematic side illustration. The leveling laser 10 comprises, as optical components, at least a laser unit 16 and an optical projection lens 34. The laser unit 16 is here implemented by a laser diode. The projection lens 34 has a three-dimensional lens surface, wherein the axis z of the coordinate system 32 coincides with the optical axis of the projection lens 34. The optical components (the exit window is not considered to be an essential optical component because it almost does not influence the properties of the laser radiation 18) furthermore comprise a collimator lens 38. The optical components together form the transmission path of the leveling laser 10. The projection lens 34 serves for refracting and spreading the laser beam into a laser fan 18a (laser plane), which extends in the plane defined by the axes x, z. The intersection of this laser fan 18a with the surface 22 produces the laser projection line 20, which is visible to the human eye. The optical components are designed according to the disclosure such that a laser projection line 20 which is lit as homogeneously as possible on the surface 22 is achieved. The laser projection line 20 extends between a starting point 50 and an end point 54 (FIG. 2a), between which the lighting of the laser projection line 20 is particularly homogeneous.

Figure 3:
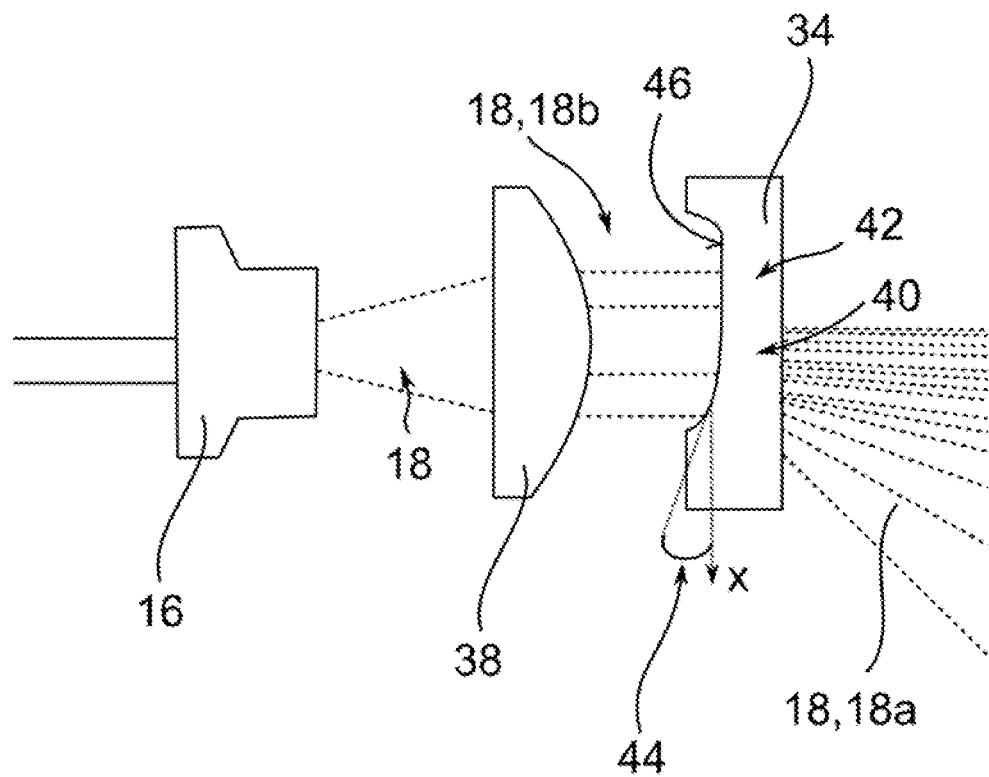
FIG. 3 shows an enlargement of the optical components of the schematic side view from FIG. 2b.

As is illustrated in an enlarged fashion in FIG. 2b and FIG. 3, laser radiation 18 is emitted by the laser unit 16 and collimated by means of the collimator lens 38 to form collimated laser radiation 18b. The projection lens 34 is illuminated by means of this collimated laser radiation 18b. Since only that part of the laser fan 18a that extends in the direction of the surface 22 is needed, the projection lens 34 is partially blackened (made opaque), with the result that it is divided into a portion 40 which is usable to produce the laser projection line 20, and a portion 42 which is not usable for producing the laser projection line 20. This division can of course also be caused in another way, for example by using a stop. The projection lens 34 is made from plastic. The projection lens 34 has a mirror-symmetric shape in the direction of the axis y, which means that no refractive power manifests in the direction of the axis y and the spreading of the collimated laser radiation 18b substantially takes place in the plane of the laser fan 18a. The laser projection line 20 is therefore presentable as being particularly narrow. It is furthermore conceivable that the projection lens 34 is configured in the direction of the axis y such that a refractive power acting in the direction of the axis y manifests. In this way, a particularly fine laser projection line 20 can be produced.

The lens surface of the projection lens 34 has—at least in the portion 40 of the projection lens 34 that is usable for producing the laser projection line 20—a shape with a surface inclination angle 44 that increases monotonically along the axis x, see in particular FIG. 3. The surface inclination angle 44 represents the angle of the lens surface 46 (facing the laser unit 16) relative to the axis x. The lens surface 46 is in particular implemented in the form of a free-form surface and can be described in the direction of the axis z by a function z=f(x), wherein the derivation z'(−x) is a monotonically increasing function. The maximum surface inclination angle 44 is—as can be seen in FIGS. 2b and 3—provided on the side of the projection lens 34 facing the surface 22 and is selected such that the smallest distance 48 (see FIG. 2a) between the starting point 50 of the laser projection line 20 and the leveling laser 10 is less than 25 mm. Furthermore, the minimum surface inclination angle 44 located on the side of the projection lens 34 facing away from the surface 22 is selected such that the greatest distance 52 (see FIG. 2a)—at which the lighting of the laser projection line 20 is still substantially homogeneous—that is to say up to the end point 54 of the laser projection line 20, is more than 1500 mm.

The invention claimed is:

1. A leveling laser for producing a laser projection line on a surface, comprising:
 a laser unit; and
 an optical projection lens having a three-dimensional lens surface facing toward the laser unit, wherein the projection lens is describable in a three-dimensional coordinate system having an x-axis, a y-axis, and a z-axis that are at right angles to one another,
 wherein the z-axis coincides with an optical axis of the projection lens and the surface onto which the laser projection line is produced lies substantially parallel to a plane defined by the y- and z-axes, and
 wherein the lens surface has, at least in a portion of the projection lens that is usable for producing the laser projection line, a shape with a surface inclination angle relative to the x-axis that increases monotonically in a direction of the x-axis.

2. The leveling laser as claimed in claim 1, wherein the projection lens has a mirror-symmetric shape in the direction of the y-axis.

3. The leveling laser as claimed in claim 2, wherein the projection lens has a cylindrical shape in the direction of the y-axis.

4. The leveling laser as claimed in claim 1, wherein the projection lens is illuminable by a collimated laser beam in the direction of the optical axis of the projection lens.

5. The leveling laser as claimed in claim 1, wherein a minimum surface inclination angle is provided on a side of the projection lens facing away from the surface onto which the laser projection line is produced.

6. The leveling laser as claimed in claim 5, wherein the minimum surface inclination angle is dependent on a greatest distance of the laser projection line from the projection lens.

7. The leveling laser as claimed in claim 1, wherein the projection lens is made from plastic.

8. The leveling laser as claimed in claim 1, wherein the projection lens and a collimator lens are integrated to form an individual lens structural element.

9. The leveling laser as claimed in claim 1, further comprising:
 a flat, substantially donut-shaped housing in which the laser unit and the optical projection lens are housed.

10. A leveling laser for producing a laser projection line on a surface, comprising:
 an optical projection lens having a three-dimensional lens surface,
 wherein the projection lens is describable in a three-dimensional coordinate system having an x-axis, a y-axis, and a z-axis that are at right angles to one another,
 wherein the z-axis coincides with an optical axis of the projection lens and the surface onto which the laser projection line is produced lies substantially parallel to a plane defined by the y- and z-axes,
 wherein the lens surface has, at least in a portion of the projection lens that is usable for producing the laser projection line, a shape with a surface inclination angle that increases monotonically in a direction of the x-axis, and
 wherein a maximum surface inclination angle is provided on a side of the projection lens facing the surface onto which the laser projection line is produced.

11. The leveling laser as claimed in claim 10, wherein the maximum surface inclination angle is dependent on a smallest distance of the laser projection line from the projection lens.

12. An optical projection lens comprising:
 a three-dimensional lens surface configured to face toward a laser unit that generates laser radiation, wherein:

the optical projection lens is describable in a three-dimensional coordinate system having an x-axis, a y-axis, and a z-axis that are arranged at right angles to one another,
the z-axis coincides with an optical axis of the projection lens, and
the lens surface has at least regionally a shape with a surface inclination angle relative to the x-axis that increases monotonically in a direction of the x-axis.

13. The optical projection lens as claimed in claim 12, wherein a maximum surface inclination angle is provided on a side of the projection lens facing a surface onto which the optical projection lens is configured to produce a laser line.

14. The optical projection lens as claimed in claim 12, wherein a minimum surface inclination angle is provided on a side of the projection lens facing away from a surface onto which the optical projection lens is configured to produce a laser line.

* * * * *